United States Patent [15] 3,667,365
Fujimoto et al. [45] June 6, 1972

[54] DEVICE FOR COMPENSATING POSITIONAL DEVIATIONS USEFUL WITH INTERCHANGEABLE LENSES HAVING SCREW THREADS

[72] Inventors: Sakae Fujimoto; Tadayuki Imai, both of Tokyo, Japan

[73] Assignee: Kabushiki Kaisha Ricoh, Tokyo, Japan

[22] Filed: Mar. 21, 1969

[21] Appl. No.: 809,286

[30] Foreign Application Priority Data

Mar. 25, 1968 Japan.................................43/19337

[52] U.S. Cl................................................95/44 R, 95/64 D
[51] Int. Cl..........................................................G03b 3/00
[58] Field of Search...................95/44 R, 64 R, 64 D, 10 C

[56] References Cited

UNITED STATES PATENTS

| | | | |
|---|---|---|---|
| 3,165,997 | 1/1965 | Sugano et al. | 95/63 X |
| 3,375,768 | 4/1968 | Klupsch | 95/45 |
| 3,439,600 | 4/1969 | Suzuki | 95/44 |

Primary Examiner—Samuel S. Matthews
Assistant Examiner—Richard L. Moses
Attorney—Burgess, Ryan and Wayne

[57] ABSTRACT

A device for compensating positional deviations in screwing interchangeable lenses into a single-lens reflex camera by means of an aperture setting ring including a pin mounted in a slot to determine its angular movement. A barrel lens has a hook element engagable with a notched area on the aperture setting ring. The hook element is mounted to have less angular movement than the aperture setting ring so that positive engagement is always provided within the range of movement of the barrel lens.

6 Claims, 7 Drawing Figures

INVENTORS
SAKAE FUJIMOTO
TADAYUKI IMAI

PATENTED JUN 6 1972

INVENTORS
SAKAE FUJIMOTO
TADAYUKI IMAI
BY Burgess, Ryan + Hicks
ATTORNEYS

DEVICE FOR COMPENSATING POSITIONAL DEVIATIONS USEFUL WITH INTERCHANGEABLE LENSES HAVING SCREW THREADS

BACKGROUND OF THE INVENTION

The present invention relates to a device for compensating the positional deviations in screwing lenses into a single lens reflex camera and more particularly a device for compensating the relative positional deviations between lenses and the camera body at the final lens mounting position, which positional deviations differ from one interchangeable lens to another. In case of a single-lens reflex camera of the type employing a screw-in lens mounting method such as "practica mount," a slight positional deviation between a lens and the camera body at the final lens mounting position will inevitably occur from one interchangeable lens to another due to the threaded engagement therebetween. Known in the art is a mechanism for coupling the diaphragm setting mechanism on the side of the lens to an automatic aperture setting mechanism on the side of the camera which coupling mechanism is adapted to couple said two mechanisms even if there occurs the positional deviation as described above. However, in the mechanism of the type in which the rotation of the aperture setting ring on the side of the lens must be transmitted to the exposure meter for brightness measurement, the aperture setting ring on the side of the lens cannot be coupled to the mechanism on the side of the camera without compensating such positional deviation as described above.

In view of the above, the primary object of the present invention is to provide a device for compensating such deviation as described above by providing a connecting element attached to the camera body or to the lens and a connection element for releasably engaging with said connecting element which is attached to the lens or to the camera.

SUMMARY OF THE INVENTION

According to the present invention, the angular range in which an aperture index cup on the lens can be coupled with an aperture setting ring on the camera body when the lens is screwed into the camera or the range of angle of rotation of a connection ring interposed between said aperture index cup and said aperture setting ring is made larger than the maximum tolerance in screwing said lens into said camera.

In one embodiment of the present invention, the connecting element and the connection element for releasably engaging with the connecting element are disposed upon the aperture index cup and the aperture setting ring respectively in opposed relation with each other, the length of the connection element being extended over a distance sufficient enough to cover the maximum tolerance in screwing the lens into the camera.

In another embodiment of the present invention, when the lens is screwed into the camera body, the connecting element can be prevented from being in contact with the connection element and can engage with the connection element only when the lens is positioned in its final mounting position.

In a further embodiment of the present invention, one connection ring is fitted over the aperture index cup or aperture setting ring in frictional engagement therewith. The connecting element is extending from the aperture index cup while the connection element of the type described is attached to the aperture setting element, or vice versa. In this case, the range of angle of rotation of the connection ring relative to the aperture index cup or the aperture setting ring is made larger than the maximum tolerance of the type described above.

According to the present invention, even if the final mounting position of the lens relative to the camera body is deviated from a reference position, the aperture index cup can be positively coupled with the aperture setting ring. Therefore, there can be provided easily in the camera a device for measuring exposure brightness at full aperture, and setting automatically the aperture to a predetermined aperture when the shutter is released for photography.

The above and other objects, features and advantages of the present invention will become more clear from the following description taken in conjunction with the accompanying drawings.

BRIEF DESCRIPTION OF DRAWINGS:

FIG. 1 being a perspective view thereof with a lens being removed from a lens mount in order to clearly show the components of the lens and the lens mount while FIG. 2 is a perspective view illustrating only the lens and its aperture setting ring;

DESCRIPTION OF THE PREFERRED EMBODIMENT

Figure 1:
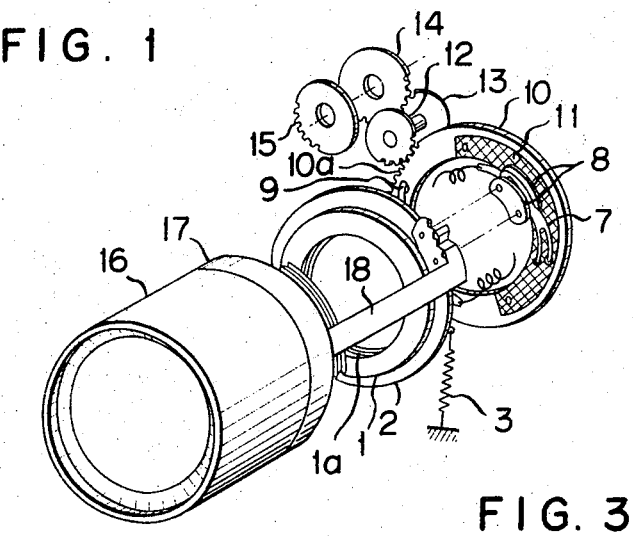
FIGS. 1 and 2 illustrate one embodiment of the present invention.
Figure 2:
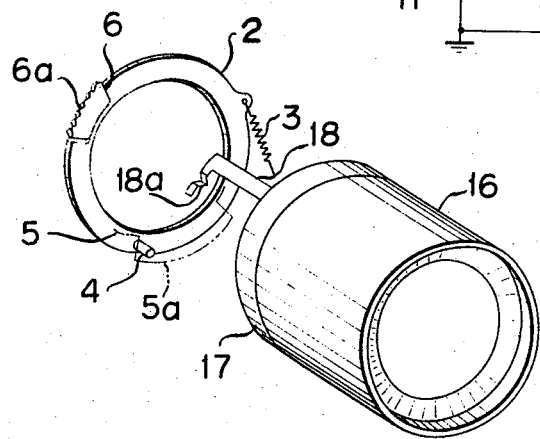

Referring to FIGS. 1 and 2 illustrating one embodiment of the present invention, a lens mount 1 is fixedly secured to the front surface of a camera body or case. The inner surface of the lens mount 1 is internally threaded as shown at 1a for threadable engagement to the externally threaded portion of a lens assembly. An exposure aperture setting ring 2 is rotatably fitted over the outer peripheral surface of the lens mount 1 and a spring 3 is loaded between the camera body and the aperture setting ring 2. A stopper pin 4 extends from the aperture setting ring 2 for movement within a slot 5a indicated by chain lines of a stop plate 5 fixedly attached to the body. A connection plate 6 having a toothed portion 6a is fixedly attached to the aperture setting ring 2 and the toothed portion 6a has a length larger than the maximum deviation caused by "screw-in" of the lens system to the camera body. A first contact element 7 made of a resilient electrically conductive material is attached to the aperture setting ring 2 through a pair of insulating members 8 at the base portion of the element 7. The base portion of a second contact element 9 also made of a resilient electrically conductive material is electrically connected to the aperture setting ring 2 in an opposed relation with the first contact element 7. A resistor ring 10 having a toothed portion 10a formed at one portion of its outer periphery is rotatably attached coaxially of the lens mount 1. A semi-circular sliding resistor plate 11 is attached to the front surface of the resistor ring 10 in electrical contact with the leading end of the first contact element. The leading end of the second contact element 9 which functions as a ground connection, contacts a further semi-circular front surface of resistor ring 10 which is adjacent to sliding resistor 11. Intermediate gears 12 and 13 are assembled in unitary construction and the intermediate gear 12 is in mesh with the toothed portion 10a of the resistor ring 10. The intermediate gear 13 is in mesh with a shutter speed selection gear 14 to which is coaxially releasably attached a film sensitivity selection gear 15, whereby when the shutter speed or film sensitivity setting is varied, the resistor ring 10 is caused to rotate.

A detent connection lever 18 made of a resilient material extends from an exposure aperture index cap 17 rotatably fitted over a lens barrel 16 and has a detent ear 18a at the free end thereof. This detent ear 18a is adapted to engage with teeth of the toothed portion 6a of the connection plate 6 attached upon the aperture setting ring 2 on the camera body when the lens barrel 16 is threadably engaged with the lens mount 1.

Figure 3:
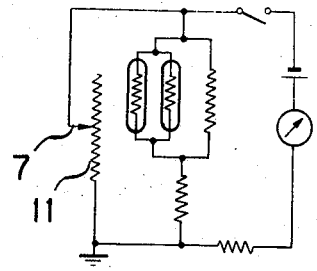
FIG. 3 is a circuit diagram of an exposure meter coupled with the rotation of the aperture setting ring.

The configurations of the connecting lever 18 and the connection plate 6 and the elasticity of the connection lever 18 are so determined that the force for connecting or coupling the connection lever 18 and the connection plate 6 becomes greater than the total of the force acting between the spring 3 and the first contact element 7 and the friction force between the second contact element 9 and the resistor ring 10 and that the engagement between the detent ear 18a and the teeth 6a is released in either direction when an appropriate external force is applied. The angle of rotation of the aperture setting ring 2 whose rotation is limited by the stopper pin 4 and the notch 5a is larger than the maximum angle of rotation of the aperture index cup 17 of an interchangeable lens. Furthermore, the angle of rotation of the aperture setting ring 2 corresponding to the angle of rotation from one stop to another of the aperture index cup 17 is made equal to that of the resistor ring 10 corresponding to one stop or step movement of the shutter speed setting means or film sensitivity setting means. Moreover, the resistance of the sliding resistor plate 11 is so suitably selected that the pointer of a meter in the meter circuit shown in FIG. 3 rotates through one LV graduated scale in response to the above one unit of angle of rotation (that is the angle of rotation from one stop to another or from one index mark to another).

Prior to the attachment of the interchangeable lens, the aperture setting ring 2 is positioned in the minimum aperture position for each of the interchangeable lenses as shown in FIG. 2 since the stopper pin 4 is in contact with one edge of the notch 5a of the stationary stopper plate 5. When the lens 16 is threadably engaged with the lens mount 1 by rotating the lens 16 in the clockwise direction against the coupling force between the connection lever 18 and the connection plate 6 to the attachment position (where the lens 16 is held securely in position) and when the aperture index cup 17 is rotated to its maximum aperture position, the detent ear 18a of the connection lever 18 engages with the teeth of the toothed portion 6a of the connection plate 6. When the exposure aperture index cup 17 is rotated from this state, the connection lever 18 is caused to rotate in unison with the aperture setting ring 2 against the spring 3 so that the first contact 7 slides over the sliding resistor plate 11, thereby varying the resistance of the meter circuit shown in FIG. 3 and consequently the pointer indication thereof. As described above, the angle of rotation of the aperture setting ring 2 is made larger than the maximum angle of rotation of the aperture index cup 17 so that the aperture setting ring 2 can be drivingly coupled with the aperture index cup 17 wherever the cup 17 is positioned or set. When the film sensitivity or shutter speed setting is varied while the aperture setting remains unchanged, the resistor ring 10 is caused to rotate while the position of the first contact element 7 remains unchanged, thereby varying the resistance of the meter circuit as in the case of the aperture setting. To remove the lens 16, it may be rotated in the counterclockwise direction against the coupling force between the lever 18 and the connection plate 6.

So far the connection plate 6 has been shown as being attached to the aperture setting ring 2, but it may be attached to the aperture index cup 17 while the connection lever 18 may be attached to the aperture setting ring 2, thus resulting in the same effect.

Figure 4:
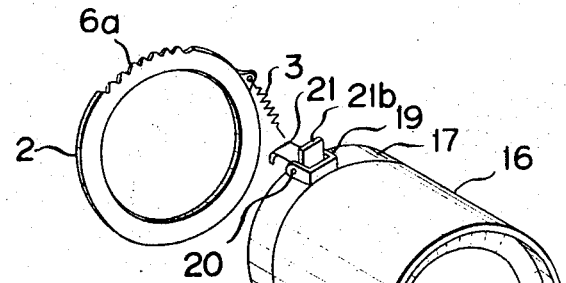
FIG. 4 is a view similar to FIG. 1 but illustrating a second embodiment of the present invention.
Figure 5:
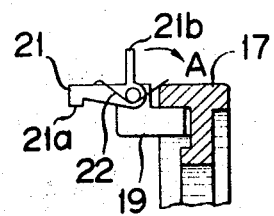
FIG. 5 is an enlarged view of the essential coupling portion between the aperture setting ring on the camera body and the aperture index cup on the lens.

Another embodiment of the present invention will be described hereinafter with reference to FIGS. 4 and 5. A bearing 19 is attached to the lens aperture index cup 17 for supporting a shaft 20 which in turn carries rotatably a connection member 21. A spring 22 extends between the aperture index cup 17 and the connection member 21 so that the detent ear 21a of the connection member 21 normally engages with the toothed portion 6a. An upright arm 21b is formed integral with the connection member 21 and is adapted to be rotated in the direction indicated by the arrow through an angle of about 90°, thereby holding the connection member 21 in position through a suitable locking means not shown. Other constructions are similar to those of the first embodiment. The interchangeable lens 16 may be attached in this state and the arm 21b is raised to the position shown in FIG. 5 by releasing the arm 21b from the locking means at the attachment position of the lens 16 thereby engaging the connection member 21 with the toothed portion 6a. The toothed portion 6a may be formed in the aperture index ring 17 while the connection member 21 is attached to the aperture setting ring 2.

Next a third embodiment of the present invention will be described with reference to FIGS. 6 and 7. A connection ring 24 is rotatably fitted over the aperture index cup 17 in frictional engagement therewith through a spring 23. The range of angle of rotation of the connection ring 24 relative to the aperture index cup 17 is made larger than the maximum tolerance of the threading or screwing rotation of the lens 16. A connection member 25 made of a resilient material extends from the connection ring 24. A stepped portion 26 for receiving the connection member 25 is formed in the periphery of the aperture setting ring 2 at such a position that whenever interchangeable lens 16 is set to its minimum exposure aperture, its connection member 25 always extends from the connection ring 24 over the stepped portion 26. Thus, when the lens 16 is rotated in the clockwise direction in FIG. 6, the detent ear 25a engages with the stepped portion 26 while when it is rotated in the counterclockwise direction, this engagement may be released by applying a suitable force. With this arrangement and construction, when the lens is attached by rotating the lens in the clockwise direction in the lens mount, the rotation of the connection ring 24 is stopped when the connection member 25 engages with the stepped portion 26 and, thereafter, only the aperture index cup 17 is rotated against the spring 23 together with the lens 16, thereby threadably engaging the lens 16 with the lens mount.

Figure 6:
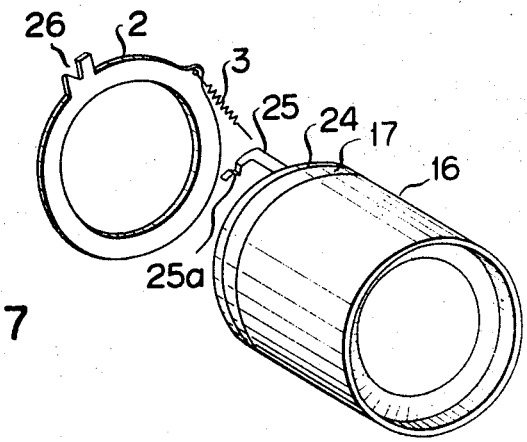
FIG. 6 is a perspective view of a third embodiment of the present invention.
Figure 7:
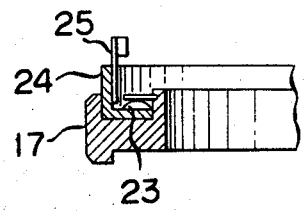
FIG. 7 is an enlarged view illustrating the coupling portion between the lens and the camera body shown in FIG. 6.

When the aperture index cup 17 is rotated in the counterclockwise direction in FIG. 6, the connection ring 24 is rotated against the spring 23 so that the aperture setting ring 2 coupled therewith through the connection member 25 is caused to rotate against the spring 3.

In the third embodiment described hereinabove, instead of coupling the aperture index cup 17 in frictional engagement with the connection ring 24, the connection ring 24 may be fitted over the aperture setting ring 2 in frictional engagement therewith while a connection member may extend from the aperture index cup 17 the member for receiving this connection member may be provided in the connection ring 24 as in the case of the first and second embodiments. Furthermore, the connection between the aperture setting ring and the aperture index cup may be effected by utilizing other locking devices such as click-ball, click-pin or the like.

As described in detail hereinabove, according to the present invention, the range of engagement between the connection member and the connection member receiving portion, that is toothed portion or the stepped portion or the angle of rotation of the connection ring is made larger than the maximum tolerance in threading the interchangeable lens into the lens mount, thereby compensating this tolerance. Especially in the construction of the second embodiment of the present invention, the lens or lens barrel can be rotated in such a manner that the above described connection member will not contact with the connection member receiving member, that is the toothed portion, whereby neither friction nor noise will be generated upon attachment or removal of the interchangeable lenses. Furthermore, in the third embodiment of the present invention in which the connection ring is fitted over the aperture setting ring or aperture index cup in frictional engagement therewith in such a manner that the angle of rotation of the connection ring relative to the aperture setting ring or aperture index cup is made larger than the maximum tolerance in screwing the interchangeable lens into the lens mount for attachment, neither friction nor noise will be generated and the manual operation for engaging or releasing the connection lever will not be required, resulting in easy and simple manipulation.

It will be clear that when the method and device of the present invention described hereinabove are applied to the TTL type single-lens reflex camera, the rotation of the aperture index cup on the interchangeable lens may be transmitted to the member fitted on the camera body by an extremely simple mechanism, thereby permitting the measurement of light brightness at full aperture which has been so far impossible in the camera of the type described.

We claim:

1. A device for compensating the positional deviations in screwing interchangeable lenses into a single-lens reflex camera comprising a lens mounting;

an aperture setting ring mounted to be rotatable within the lens mounting to control aperture setting, said setting ring having a biasing spring connected thereto;

means associated with said setting ring to provide a limited range of angular movement;

a connection element affixed to said setting ring, said connection element having an integral notched portions;

each lens being selectively rotatable and mountable within the lens mounting;

an aperture index cup mounted on one end of said lens and having a predetermined rotational movement, said predetermined movement being less than said limited movement of said setting ring; and a connecting lever extending from said index cup and having a hook-shaped element at its remote end, said element adapted to engage said notched portion when said lens is fully threadedly engaged.

2. A device according to claim 1 in which said means associated with said setting ring comprises a pin extending from said setting ring and movable within a notch located in a fixed element within the camera, said notch determining said limited range of movement.

3. A device according to claim 1 in which said notched portion comprises a toothed area, and said hook-shaped element is formed as a detent ear that is adapted to engage said toothed area.

4. A device according to claim 3 in which said connecting lever is formed of resilient material to provide elasticity for the engagement between said toothed portion and said detent ear.

5. A device according to claim 1 in which said hook-shaped element includes an arm that is rotatable to provide the engagement.

6. A device according to claim 1 in which said notched portion comprises a stepped portion, a connection ring is rotatably mounted on said index cup, said connection ring mounted to have a greater angular movement than said index cup, and the connecting lever is mounted on said connection ring for engagement with said stepped portion.

* * * * *